United States Patent [19]

Rohm et al.

[11] 4,170,935
[45] Oct. 16, 1979

[54] FRUIT JUICE EXTRACTION APPARATUS

[75] Inventors: Robert F. Rohm, Yorba Linda; Ronald C. Bushman, Hacienda Heights, both of Calif.

[73] Assignee: Brown International Corporation, Covina, Calif.

[21] Appl. No.: 842,549

[22] Filed: Oct. 17, 1977

[51] Int. Cl.² .......................... B30B 3/04; B30B 9/20
[52] U.S. Cl. ................................ 100/121; 100/98 R; 100/158 C
[58] Field of Search .................. 100/97, 98, 116, 121, 100/158 C; 99/503, 508

[56] References Cited

U.S. PATENT DOCUMENTS

| | | | |
|---|---|---|---|
| 2,767,644 | 10/1956 | Bireley | 100/98 R |
| 2,793,583 | 5/1957 | Messing | 100/121 X |
| 3,017,821 | 1/1962 | Bireley et al. | 100/98 R X |
| 3,218,962 | 11/1965 | Alexander et al. | 100/158 R X |
| 3,351,000 | 11/1967 | Alexander | 100/98 R |
| 3,559,567 | 2/1971 | Yoritomi | 100/158 C |

FOREIGN PATENT DOCUMENTS 988607  5/1951  France ................... 100/158 C

*Primary Examiner*—Peter Feldman
*Attorney, Agent, or Firm*—Paul A. Weilein

[57] ABSTRACT

Fruit juice extraction apparatus in which a pair of confronting frusto-conical discs are supported on a rotatable main shaft by ball and socket connections and retained in angular tilted relation by guide bearing assemblies to provide a point of minimum peripheral spacing between the discs on one side, a stationary wall being interposed between the discs and cooperating therewith to form separate pressure-applying travel paths for the respective halves of cut fruit sections, each of the paths converging in the direction of disc rotation from a path inlet adjacent the minimum spacing point to an outlet. The whole uncut fruits are supplied in advance of the minimum spacing point and gripped between the discs and carried to a slicing knife for cutting into half-sections which are carried through the converging paths and forced against perforate portions of the stationary wall by progressively applied pressure to extract the juice. As the outlets of the paths are approached, the cut faces of the fruit sections are forced against stationary spaced bars between which the pulp projects. A pair of rotatable rolls supported between the discs at the outlet have surface projections which extend between the bars to engage, further squeeze and remove the pulp projecting between the bars, and at the same time move the fruit section against a knife to shear the pulp from the peel. Length adjustable collar spacers on the main shaft provide relative spacing adjustments of the discs and stationary wall.

28 Claims, 13 Drawing Figures

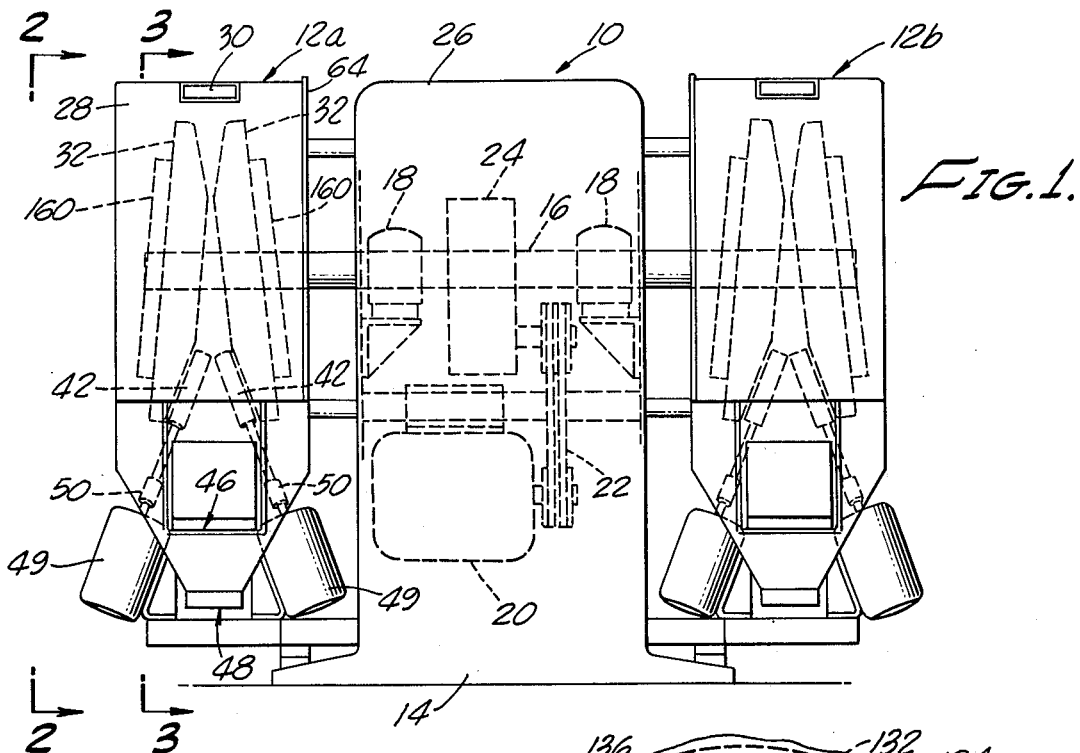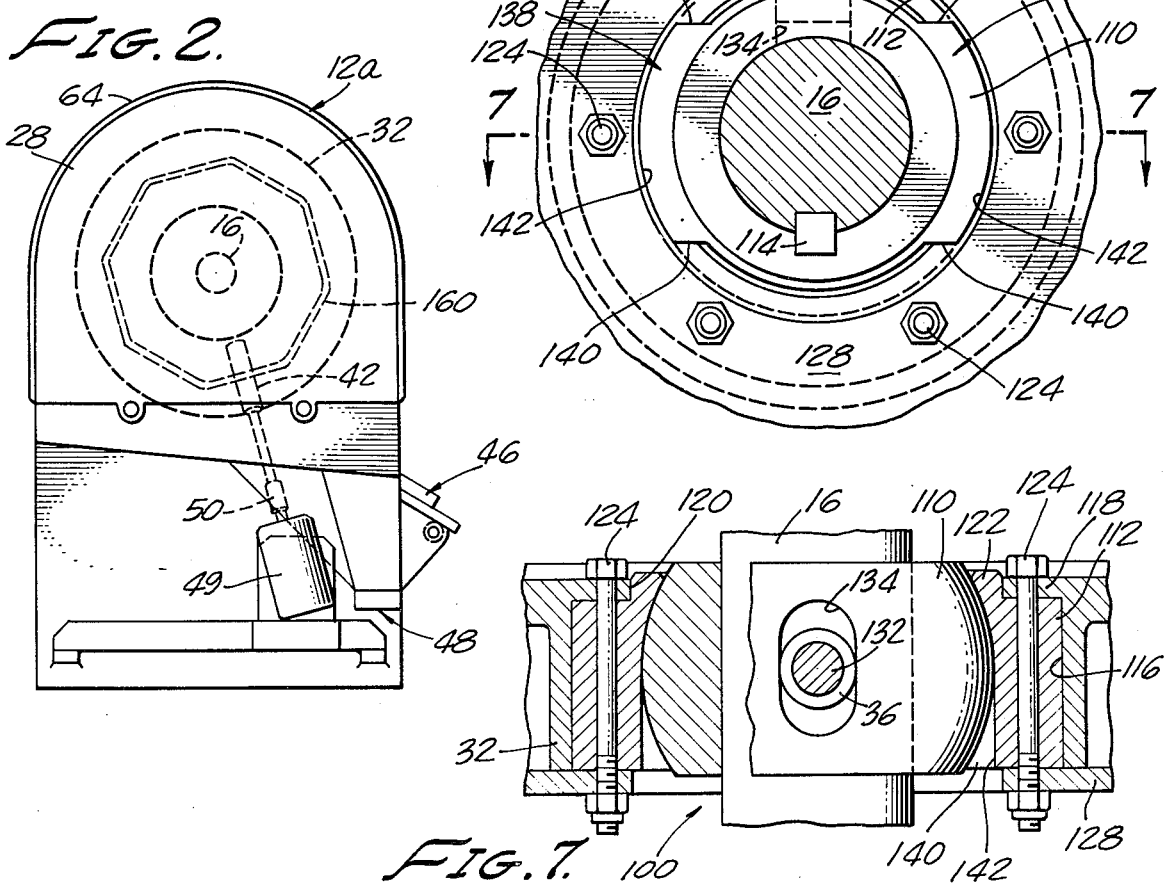

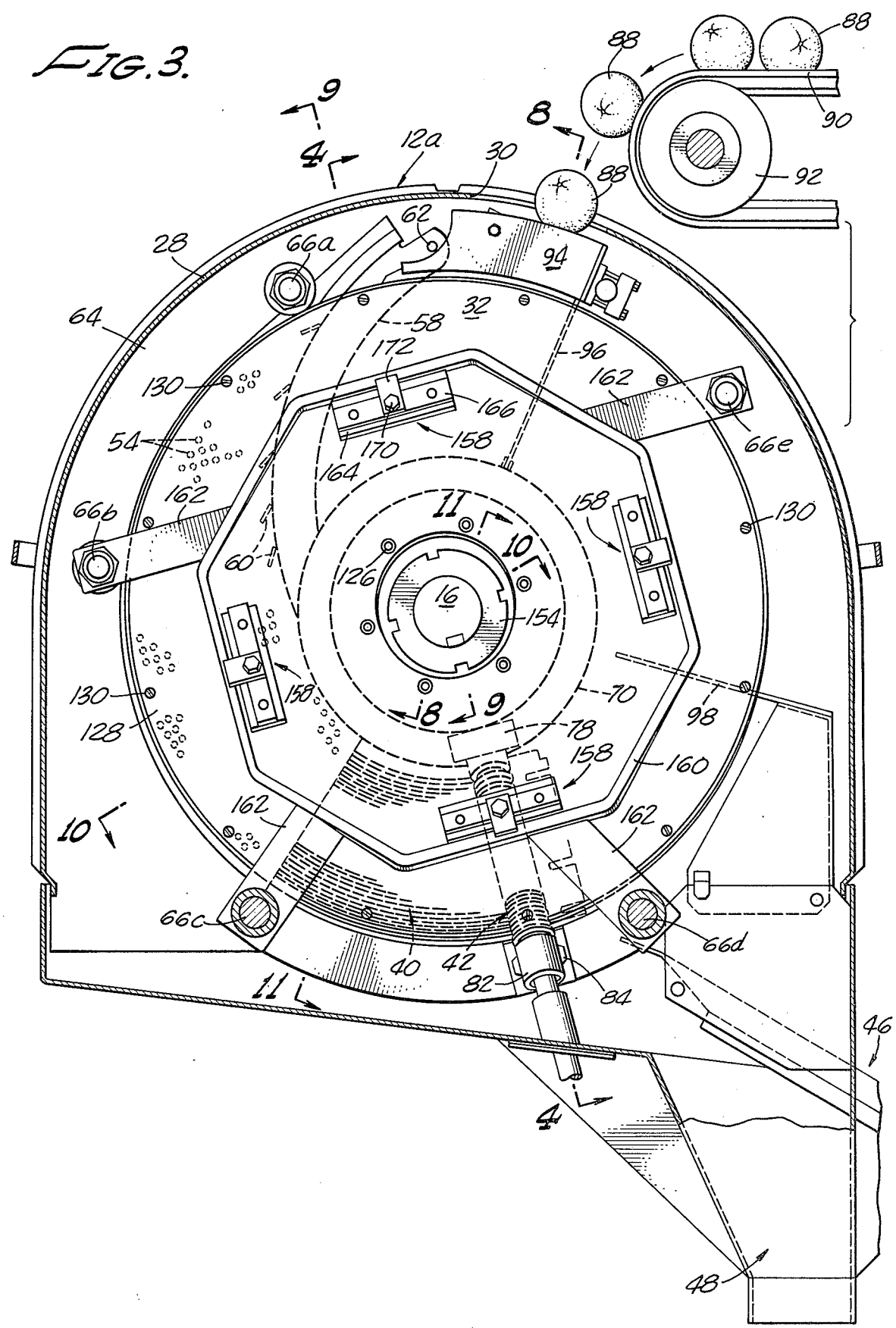

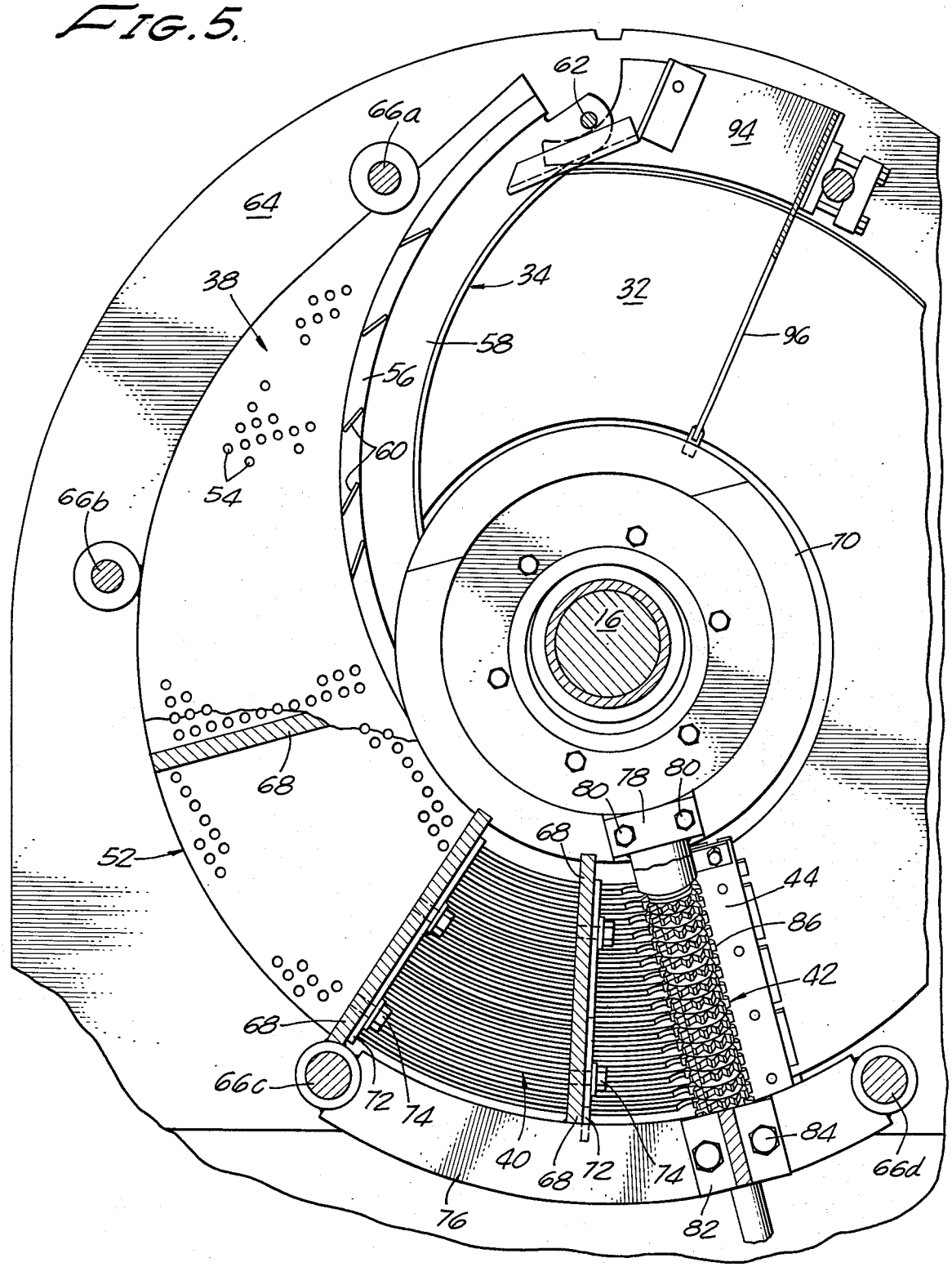

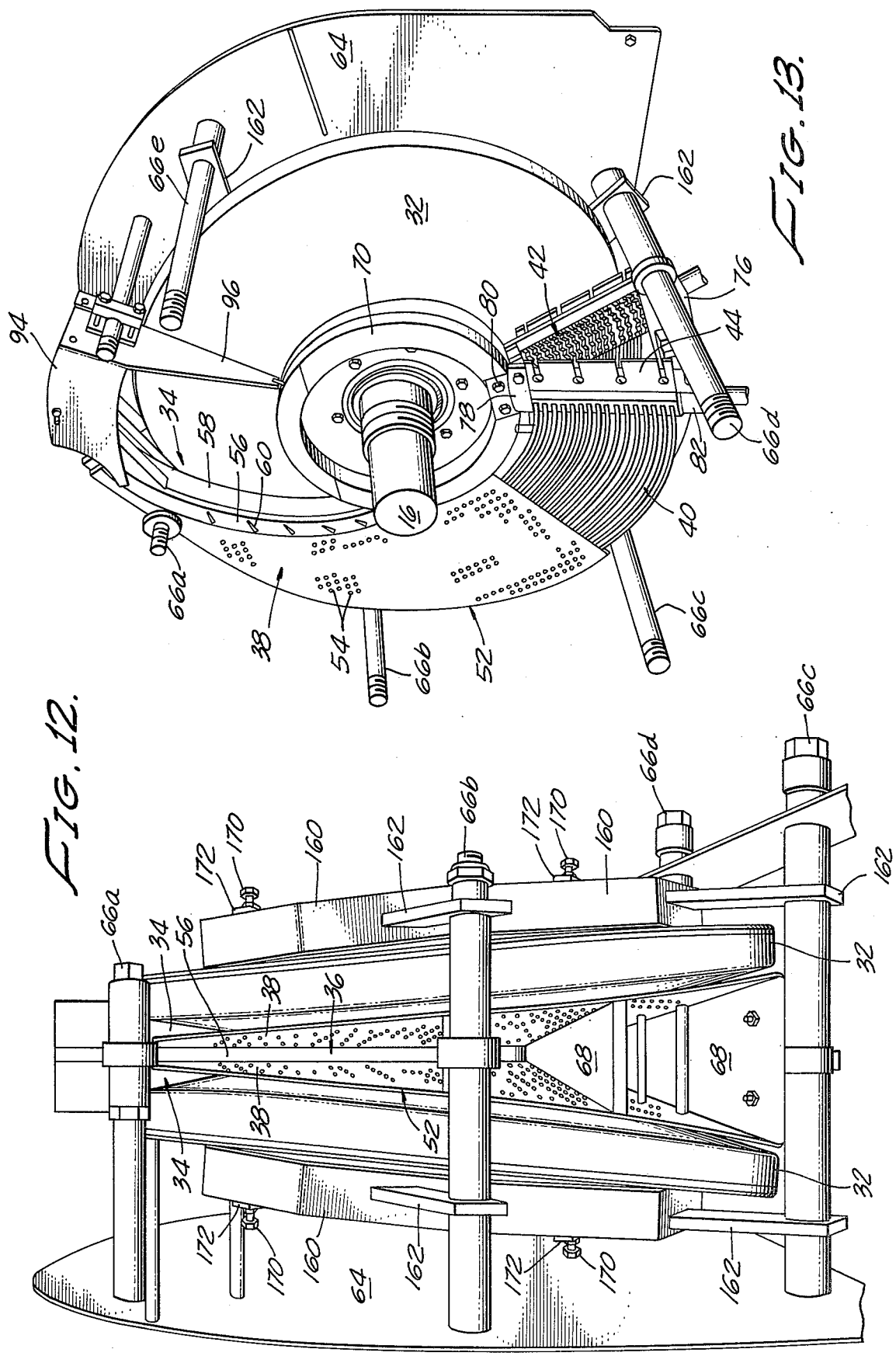

FRUIT JUICE EXTRACTION APPARATUS

BACKGROUND OF THE INVENTION

The present invention relates generally to the extraction of juice from fruits, particularly citrus fruits such as oranges, lemons, grapefruit and the like.

It has been generally known heretofore from U.S. Pat. No. 2,767,644, granted to F. W. Bireley on Oct. 23, 1956, as well as from later improvements thereon, to provide citrus extraction apparatus wherein a pair of rotatable confronting parallel frusto-conical discs cooperate with stationary wall forming means therebetween in a manner to form separate pressure-applying paths which respectively converge from their inlet ends to their outlet ends in the direction of rotation of the discs. Whole fruits are introduced and gripped between resilient grooved surfaces of the discs that drive the fruit through a stationary or rotary knife that severs the fruit into half-sections, these half-sections then being moved into the respective pressure-applying paths and past slitting knives which nick the cut faces of the sections so that the sections can be progressively compressed between each disc and its associated stationary perforate wall.

The Bireley type citrus juice extractor has been found to be a durable high-production machine which is economically operable for long operating periods. A main problem, however, with the Bireley type extractor has been high peel oil in the juice, and a number of improvements have been made on it in an effort to produce a higher quality of juice with lower peel oil. For example, one such significant improvement is that which is disclosed in U.S. Pat. No. 3,351,000, granted to L. B. Alexander on Nov. 7, 1967, wherein a final open bar grid section is introduced into the stationary wall structure following the perforated portion thereof, so as to relieve pressure on the peel of the fruit section during its final high compression in the pressure-applying path. A rotatable roll is also mounted so as to extend transversely of the bars of this section, the roll having axially spaced circumferential rows of projections or teeth for engaging the bulging pulp between the bars in a manner to drive the compressed fruit sections against a knife blade positioned to sever the juice-bearing pulp from the peel of the section.

Due to the higher quality of juice with lower peel oil which could be obtained from the foregoing improvements, early consideration was given to the possibility of applying the features of the Alexander patent to the structure of the Bireley type extractor. It soon became evident, however, that the use of parallel confronting frusto-conical discs would not provide a sufficiently wide spacing to permit the installation of the two rotatable rolls as would be required to finally process the fruit sections of the separate pressure-applying paths. It also became evident that, if the spacing between the parallel frusto-conical discs was sufficiently increased so as to be able to accommodate the two rotatable rolls, the spacing of the discs would be so great at the inlets to the pressure-applying paths that the confronting discs could not be utilized to feed the whole fruits to the cutting means in the manner usually employed in the Bireley extractor.

According to the present invention, the problems as just described above have been solved in a unique and improved design in which the frusto-conical discs are disposed in rotatable tilted relation, rather than in the previously used parallel relation. The confronting discs are tilted in such a manner that a point of minimum spacing will occur adjacent the inlet to the pressure-applying paths, and a point of maximum spacing will occur adjacent the outlet of the pressure-applying paths, this latter spacing providing the required necessary space for the mounting of the two roll members. The feed problem is also solved in that whole fruit may be introduced in advance of such point of minimum spacing, and since the discs are approaching the point of minimum spacing, the introduced fruit will be firmly gripped, even though of varying size, and carried to the cutting means without injury or slipping which could produce undesirable peel oil. As thus arranged, the formerly used fruit-gripping grooves on the discs are no longer needed or necessary.

In the development of the present invention, consideration has also been given to the heretofore known rotary screening devices of the character disclosed in U.S. Pat. No. 2,149,017, granted to C. W. Gordon on Feb. 28, 1939; and the continuous rotary press arrangement as disclosed in U.S. Pat. No. 2,084,229, granted to D. H. J. Van Maanen on June 15, 1937. While these patents both disclose the concept of rotatably mounted confronting discs in tilted relation, it will be observed that the discs are in each case arranged with their maximum spacing at the point of supply of the material that is to be processed. Obviously, the disc orientation of these patents would not solve the problems which have been solved by the disc arrangement as utilized in the present invention.

SUMMARY OF THE INVENTION

The present invention provides a unique and improved high-production juice extractor for a more economical commercial production of higher quality juice with a minimized amount of peel oil, and which utilizes the concept of confronting rotatably mounted frusto-conical discs, final open bar grid sections in the final high compression portions of the pressure-applying paths, and toothed rolls operatively associated with the open bar grid sections.

It is one object of the herein described invention to provide an improved high-production juice extraction apparatus of the rotatable disc type, in which the discs are in confronting angular tilted relation.

A further object is to provide such apparatus with a unique arrangement of guide bearing assemblies for maintaining the discs in their tilted positions, these assemblies being individually adjustable to permit fine tuning positioning adjustments of the tilt angle of each of the discs.

A further object resides in the provision of such apparatus, wherein whole fruits are supplied between angularly tilted discs at a point in advance of a point of minimum peripheral spacing thereof, so that the fruit will be firmly gripped, although of varied size, and carried to cutting means for severing each fruit into half-sections, and further nick the cut faces of the fruit sections prior to their entering pressure-applying paths.

A further object is to provide an improved juice extractor of the rotatable disc type in which the fruit-engaging surfaces of the discs are smooth in order to reduce injury to the fruit peel and maintain the amount of peel oil in the juice at a low level.

A further object is to provide a juice extractor according to the previous object wherein the supplied fruits will be gripped between confronting surfaces of the discs, and in which disc wiper means are provided in advance of the gripping area to remove juice, pulp and/or seeds from the disc surfaces, to thereby reduce slippage between the disc surfaces and the gripped fruit.

A still further object is to provide such apparatus in which a pair of rotatable circumferentially toothed rolls are disposed adjacent the outlets of the pressure-applying paths, and at the peripheral point of maximum spacing between the confronting tilted discs for cooperation with spaced bar grid sections.

Still another object of the invention is to provide a rotatable disc type juice extractor in which the rotatable disc is attached to a rotatable shaft by means of a ball and socket joint in which the socket portion is uniquely constructed to facilitate preassembly of the socket portion and ball portion into operative concentric relation.

Another object is to provide a rotatable disc type fruit juice extractor in which confronting frusto-conical discs are respectively supported on a rotatable shaft for unitary rotation therewith by means of ball and socket joint means permitting relative tilting movements of the discs on the shafts, and in which guide bearings operatively maintain the discs in a predetermined angular tilted relation during their rotation.

It is also an object to provide apparatus according to the foregoing object, in which the confronting discs cooperate with an interposed stationary structure therebetween to form pressure-applying paths, and in which the discs are individually axially adjustable on the shaft to vary the spacing therebetween, and also to independently vary the spacing of the discs in relation to the stationary structure. The simplicity and versatility of this adjustment feature materially reduces service and maintenance time required in the field for the apparatus, over that required in previous designs in which the discs were fixedly keyed to the shaft, and the cooperative stationary structures were varied as to their operative positions by means of a plurality of spacer collars, shims, and the like.

Further objects and advantages of the invention will be brought out in the following part of the specification, wherein detailed description is for the purpose of fully disclosing a preferred embodiment of the invention without placing limitations thereon.

BRIEF DESCRIPTION OF THE DRAWINGS

Referring to the accompanying drawings, which are for illustrative purposes only:

FIG. 1 is a side elevational view of a two-run fruit juice extraction apparatus embodying the features of the present invention;

FIG. 2 is an end elevational view, as seen along line 2—2 of FIG. 1;

FIG. 3 is an enlarged fragmentary sectional view taken through one of the runs, substantially on line 3—3 of FIG. 1;

FIG. 5 is an enlarged fragmentary transverse sectional view, taken substantially on line 5—5 of FIG. 4 to show the perforate wall sections of the stationary structure, portions being cut away to more clearly show the operative position of one of the toothed rolls and a spaced bar grid section;

FIG. 6 is a fragmentary side elevational view, partly in section, taken substantially on line 6—6 of FIG. 4 and showing details of one of the ball and socket joints for connecting a rotatable disc to the shaft;

FIG. 7 is an enlarged fragmentary transverse sectional view through the ball and socket joint, taken substantially on line 7—7 of FIG. 6;

FIG. 12 is an enlarged fragmentary side elevational view of one of the runs of the apparatus, the enclosing casing being removed to disclose the cooperative relationship and supporting means for the stationary structure between the discs, and the frame structure for supporting the disc guide bearings; and FIG. 13 is an enlarged fragmentary perspective view with one of the rotating discs removed to disclose further details of the stationary structure between the discs, and the fruit feeding area.

DESCRIPTION OF A PREFERRED EMBODIMENT

Figure 4:
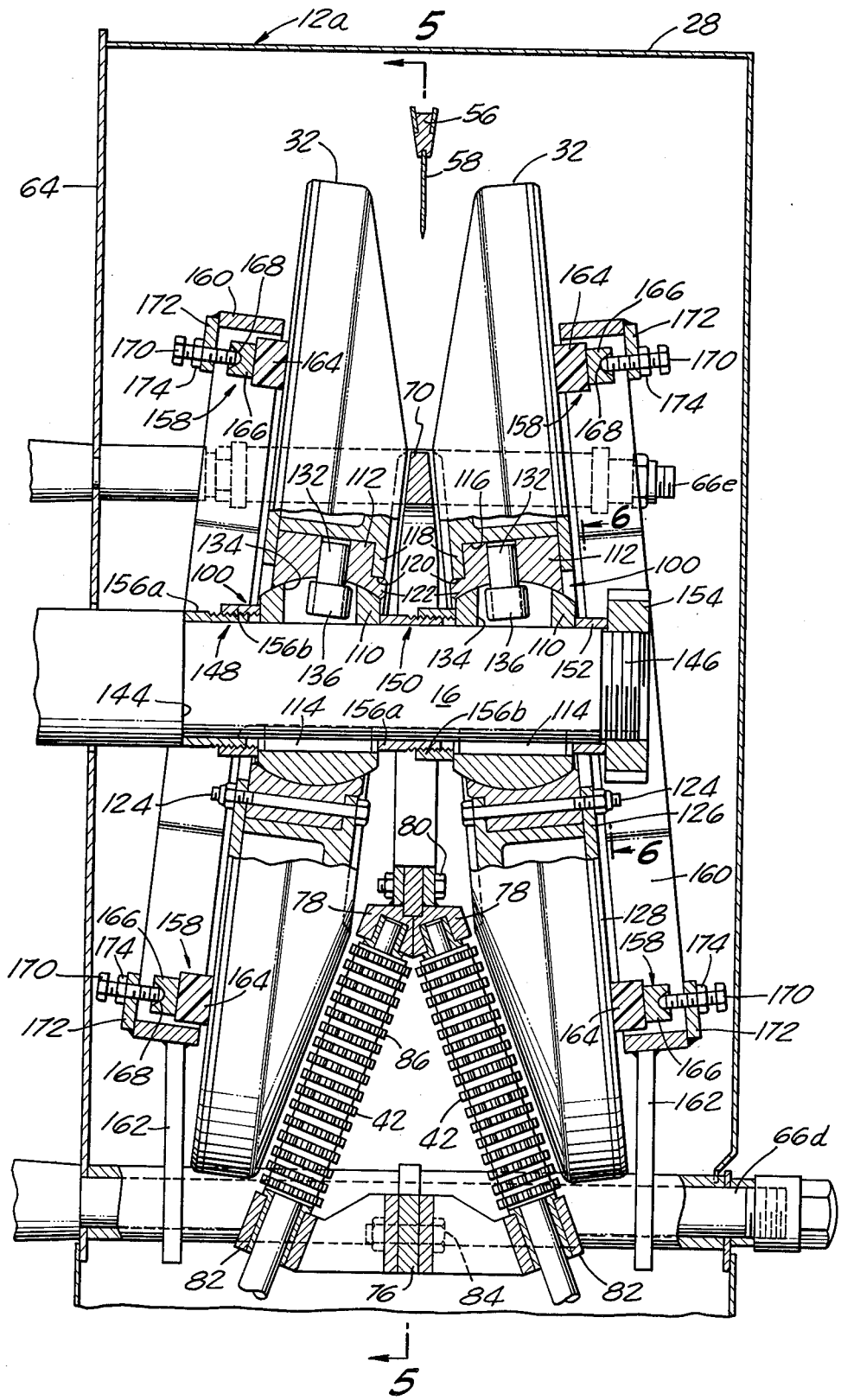
FIG. 4 is an enlarged fragmentary sectional view taken substantially on line 4—4 of FIG. 3, and showing the details of the confronting tilted discs and means for guidingly maintaining the discs in tilted position.

Referring more specifically to the drawings, for illustrative purposes, the invention is shown in FIG. 1 as being embodied in a "two run" juice extractor which is composed of a main central driving section 10 which is operatively coupled at its opposite ends with similarly constructed extraction sections 12a and 12b. Each extractor section operates as a complete "single run" juice extractor, and while only one of these juice extraction sections will be described in detail as required for a "single run", it is contemplated that a plurality of runs may be operated from a single drive section.

More specifically, the main driving section comprises an appropriate base structure 14 providing a support for an elongate main driving shaft 16 journalled in spaced apart main bearings 18. The shaft is driven by a motor 20 having a V-belt driving connection 22 with a shaft mounted speed reducer 24. The driving components as just described are preferably enclosed within a suitable housing or casing 26.

Referring generally to FIGS. 1, 4, 5 and 12, it will be seen that the operative components of the extraction section are enclosed by an appropriate housing or casing 28 having a top opening 30 through which whole fruits are fed into the top space between a pair of angularly tilted frustoconical confronting discs 32 which grip the fruit and carry it to cutting means 32 where the fruit is cut into half sections. These half sections are carried by the rotation of the discs into converging pressure-applying paths 34 formed between each of the disc surfaces and a stationary structure 36, the stationary structure being formed with a wall having a perforate section 38 against which the fruit section is initially pressed, and a spaced grid bar section 40 where it is finally pressed and subjected to the action of a rotatably mounted toothed roll 42 and an associated knife 44 which cooperate to remove the pulp from the peel. The peel is discharged through an outlet opening 46, and the collected juice through an outlet 48. The toothed rolls 42 are in each case driven by a motor 49 through a flexible coupling 50.

The operation of the discs 32, perforate wall section 38, spaced grid bar section 40, and the toothed roll 42 with respect to the extraction of juice and separation of the pulp and peel during the movement of the fruit section through each of the pressure-applying paths is substantially the same as disclosed in the Alexander U.S. Pat. No. 3,351,000, and to the extent necessary is incorporated herein by reference.

The discs 32 are supported by means, which will hereinafter be explained more fully, for rotation in angular tilted relation such that a point of minimum peripheral spacing between the discs will occur in the top area of the juice extractor section, and a point of maximum peripheral spacing will occur diametrically on the opposite side in the bottom area. The stationary structure 36 is supported between the discs and, as will be seen in FIG. 5, comprises a pair of arcuate wall structures 52 which extend through an angle of substantially 180° from the top area of the extractor to the bottom area. These wall structures are in outwardly diverging angular relation, as shown in FIG. 12, and extend from a closely positioned relation at their ends which are contiguous to the fruit inlet, and gradually increase to a wider separation at the ends which are adjacent the outlet. These wall structures cooperate with the adjacent walls of the discs 32 to provide the pressure-applying paths 34 which respectively converge in the direction of rotation of the discs from a path inlet adjacent the point of minimum spacing of the discs to a path outlet adjacent the point of maximum spacing of the discs. Each of the wall structures 52 includes a perforate section 38 provided with suitable perforations 54 for the flow of extracted juice, and a following grid bar section 40.

At the delivery ends of the pressure-applying paths, the inner margins of the perforate sections 38 are connected with a knife holder member 56 which provides a backup for an arcuate fruit bisecting knife 58 for cutting the delivered fruit into halves, and for a plurality of laterally extending spaced apart slitting knives 60 to notch the cut faces of the fruit halves as they are moved into the pressure-applying paths. The fruit bisecting knife 58 is supported at its upper end on a rod 62 which extends through a bulkhead 64 from supporting frame structure within the driving section 10. The knife holder member 56 is rigidly supported on outer rod members 66a and 66b of a plurality of such rods that are arranged around and outwardly of the discs 32, and which have their inner ends anchored to the frame structure of the driving section 10.

The portions of the wall structures, where the perforate sections 38 are joined with the grid bar sections 40, are separated by a plurality of inwardly tapered radial spacer plates 68 having their inner ends secured to a hub ring 70 which is concentric to the driving shaft 16. The two lowermost spacer plates 68 serve as supports for mounting flanges 72 of the grid bar section 40, these flanges being secured as by retaining bolts 74. These lowermost spacer plates have their outermost ends supported from rods 66c and 66d which are interconnected by an arcuate bridging frame member 76.

An important advantage is obtained through the use of frusto-conical discs that are mounted in confronting angularly tilted relation as shown in FIG. 4. Such an arrangement provides the necessary space in the high pressure area of the grid bar sections 40 to accommodate the two toothed rolls 42. As shown, these two rolls are preferably of uniform overall diameter and are supported with their axes of rotation disposed in inwardly converging relation, the inner ends of the rolls being rotatably supported in closely adjacent bearing blocks 78, each of which is mounted to the hub ring 70 as by retaining bolts 80. The outer ends of the rolls are supported in suitable bearings 82 which are more widely spaced and are secured to the bridging frame member 76 as by retaining bolts 84.

Each of the rolls 42 is operatively associated with a grid bar section 40 so that its axially spaced circumferential rows of teeth 86 will be positioned respectively between the spaced bars of the operatively associated grid bar section in a manner to engage the protruding pulp of a fruit half section as it is pressed against the bars by the associated disc 32. The teeth thus operate to further remove juice from the pulp, as well as to remove the pulp from the peel. Also, at the same time the teeth operate in conjunction with the associated disc to propel the fruit section to the knife 44 which is properly positioned so that its cutting edge will sever the remaining pulp from the peel of the fruit section.

Another important advantage in utilizing the tilted disc arrangement, is that a greatly improved feeding action is obtained for advancing the introduced whole fruits to the cutting means at the entrance to the pressure-applying paths in a manner such that the production of peel oil during the feeding operation will be greatly reduced.

As shown in FIGS. 3 and 5, whole fruits 88 may be delivered to the top opening 30 by any suitable means. For illustrative purposes, appropriate delivery means has been depicted as comprising a conveyor in which a conveyor belt 90 trained around a rotatably mounted pulley 92 will operate to successively supply and deliver the fruit by gravity through the opening 30 into a guide chute 94 which cooperates with a guide panel 96 interposed between the discs to guide the entering fruit into a proper position between the confronting peripheral surface portions of the discs. It is desirable to have the fruit enter between the discs at a position approximately 30° in advance of the point of minimum spacing between the disc peripheries. In this manner, the entering fruit, which may vary as to size, will automatically find its proper position between the confronting disc surfaces, and as the discs continue to rotate, the fruit will be positively gripped with an increasing force as the fruit is carried towards the point of minimum spacing between the disc surfaces. At this point, the fruit wall be moved first against the cutting edge of the bisecting knife 58 and thereafter nicked by the slitting knives 60 as the fruit half sections enter the pressure-applying paths in which they will be subjected to progressively increasing juice extracting pressure.

Due to the gripping action of the discs on the supplied fruit, it is possible to utilize discs with smooth confronting surfaces, rather than discs having a series of spiralled surface grooves as conventionally utilized heretofore. Thus, injury and production of peel oil during the feeding operation is greatly reduced. It will be appreciated that, in order to guard against slippage between the surfaces of the discs and the engaged fruit, the discs should preferably be devoid of any juice, pulp or seeds from the juice extracting operation which has just taken place. Accordingly, a disc wiper 98 is appropriately positioned between the outlet opening 46 and the guide panel 96 to remove any such materials remaining on the disc surfaces prior to reaching the feed area.

Figure 8:
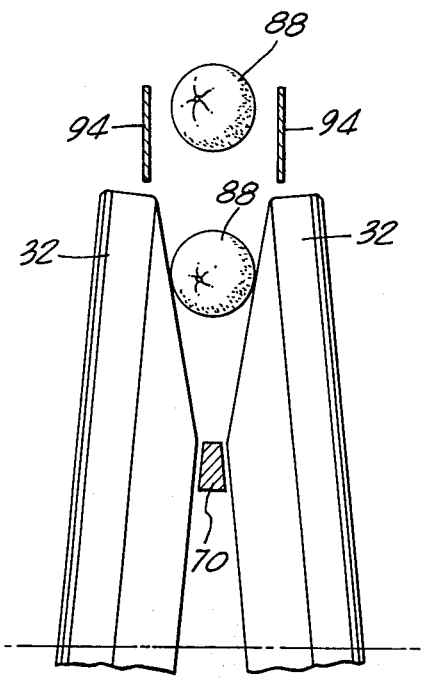
FIGS. 8 and 9 are enlarged fragmentary sectional views taken respectively on lines 8—8 and 9—9 of FIG. 3 to diagrammatically illustrate the gripping action of the discs with respect to an entering fruit, and its carriage to the fruit cutting means.
Figure 9:
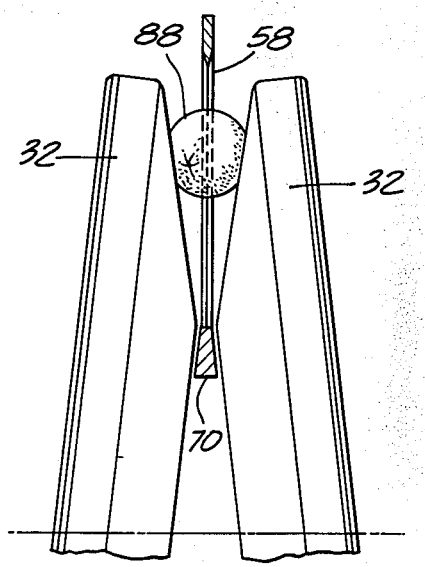

The feeding action of the discs 32 and the manner in which the fruit is gripped and carried to the cutting means is diagrammatically illustrated in FIGS. 8 and 9. As shown in FIG. 8, the fruit 88 will gravitatingly assume a position between the confronting disc surfaces depending upon the size of the fruit. As the discs are rotated, the spacing between the confronting surfaces, which engage the fruit, will progressively diminish as the point of minimum spacing between the discs is approached, as shown in FIG. 9. At this position the fruit is firmly gripped and the opposite sides depressed without injury to the fruit, and will thus be carried against the cutting edge of the fruit bisecting knife 58 and separated into half-sections which are then carried into the separate pressure-applying paths 34.

Figure 10:
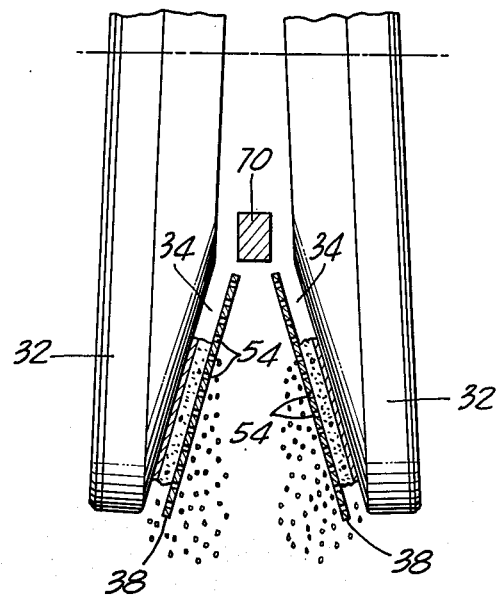
FIG. 10 is a similar sectional view, taken substantially on line 10—10 of FIG. 3 to diagrammatically illustrate the compressing action on the fruit sections in the perforated wall section portion of the pressure-applying path.

As best shown in FIG. 10, as the fruit is moved over the perforate wall section 38, the fruit section will be progressively further compressed by a progressively increasing pressure and fruit juice will be forced from the pulp and flow through the perforations 54.

Figure 11:
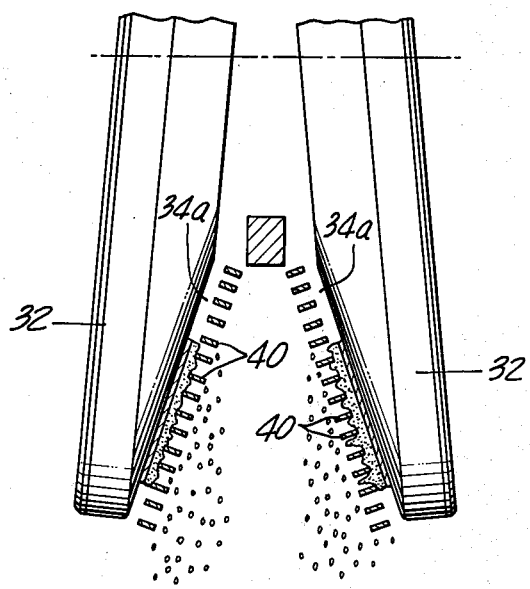
FIG. 11 is a similar view, taken substantially on line 11—11 of FIG. 3, to illustrate the compressing action of the fruit sections against the spaced bar grid section of the pressure-applying path.

When the fruit section reaches the grid bar section 40, as shown in FIG. 11, the spacing between the disc surface and the bars of the grid bar section will have been decreased as indicated at 34a, and in this area the fruit section will be pressed with a greater force against the grid bars to further extrude juice therefrom. In this bar section, it will be observed that the pulp will bulge outwardly into the spaces between the bars and will be subsequently engaged by the teeth of the toothed roll 42 for the purpose previously explained.

Operating advantages of the present invention are obtained by the unique means for mounting the frusto-conical discs on the main shaft 16, and associated means for maintaining the discs in a predetermined angular confronting relationship during their rotation. As best shown in FIGS. 4, 6 and 7, each of the discs is mounted to the shaft by means of a ball and socket joint as generally indicated by the numeral 100, and which comprises a ball portion 110 which is carried by the shaft and a socket portion 112 carried by the disc, the parts of the ball and socket joint being so constructed and interconnected as to enable the disc to rotate with the shaft and yet be relatively angularly tilted with respect to the axis of rotation of the shaft.

The structural details of the ball and socket joint are best shown in FIGS. 4, 6 and 7. Each ball portion 110 is retained on the shaft for rotation therewith by a key member 114 which, however, permits axial adjusting movement of the ball portion along the shaft. The socket portion 112 is seated within a central recess 116 of the disc frame structure with its inner end engaged with an inwardly extending radial flange 118 which surrounds an opening 120 adapted to receive an inner end flange 122 of the socket portion. The socket portion is retained within the recess 116 and fixedly secured to the disc frame structure by means of a plurality of circumferentially spaced retaining bolts 124 which extend through the radial flange 118 and the inner peripheral margin 126 of a disc end plate 128 which may be further secured at its outer periphery by circumferentially spaced retaining screws 130, as shown in FIG. 3. The ball portion 110 and socket portion 112 are interlocked by connection means which prevents relative rotation but enables tilting movement of the socket portion on the ball portion. For this purpose, the socket portion 112 is provided with an inwardly projecting pin 132 having its innermost end positioned within and being movable along an elongate axially extending slot 134 formed in the ball portion 110. Preferably, the innermost end of the pin 132 is provided with an anti-friction roller 136.

The ball portion 110 and socket portion 112 have circumferentially interfitting spheroidal surfaces of transverse concavo-convex configuration to permit the relative tilting movements of one with respect to the other during disc rotation. The joint portions are arranged for assembly of the ball portion 110 into the socket portion 112, prior to mounting the assembled joint in an operating position on the disc. To facilitate the assembly of the ball portion into the socket portion, the outer end of the socket portion 112 is provided with diametrically aligned opposed cutouts 138 which extend between circumferentially spaced parallel wall portions 140 and a bottom cylindrical wall portion 142. It is a significant consideration in this construction that the diametric measurement between the wall portions 142 should be compatible with the maximum diameter of the circumferentially extending groove of the socket portion and in that it should be slightly larger than the maximum diameter of the convex portion of the ball portion 110. Also, it is important that the spacing between the walls 140 of each cutout should be slightly greater than the length of the ball portion 110 between its end walls.

With the dimensional relationships, as described above, the ball and socket joint may be readily preassembled by inserting the ball portion 110 edgewise into the cutouts 138, which will permit the ball portion to be moved into the general area of the surrounding groove of the socket portion, whereupon the ball portion then may be rotated through an angle of 90° into its coaxial operative position within the socket portion 112.

The ball and socket joints are advantageously adjustably mounted on the shaft by unique means which permits not only adjustment of the spacing between the discs, but also independent adjustment of each disc with respect to the operatively associated stationary structure and the wall structures 52 thereon with which the discs coact to form the pressure-applying paths 34. For this purpose, the discs are mounted upon a shaft end portion which extends between an inner abutment shoulder 144 and a threaded shaft end 146. The mounted positions of the disc structures on the shaft end are determined by spacer collars 148, 150 and 152. The spacer collar 148 is disposed between the abutment shoulder 144 and the ball portion 110 of the inner disc, the spacer collar 150 between the ball portions of the inner and outer discs, and the collar 152 between the ball portion of the outer disc and the threaded end 146 of the shaft. This arrangement permits the discs to be clampingly mounted on the shaft by the coaction of a retaining nut 154 engaged with the threaded shaft end 146 and the abutment shoulder 144. The spacer collars 148 and 150, it will be noted, are constructed so as to be variable in length, and this is accomplished by providing in each case a pair of threadedly coupled tubular sections 156a and 156b.

As illustrated in FIGS. 3, 4 and 12, the frusto-conical disc structures 32 are guidingly and adjustably maintained in a predetermined tilted angular relation by a unique arrangement of thrust bearing assemblies 158 which are concentrically arranged about the periphery of each disc and arranged to bear against the end plate 128 of the disc structure in a manner to retain the disc in a predetermined tilted angular position on the shaft 16 during rotation of the disc. The bearing assemblies are supported in 90° relation upon a ring-like frame member 160 which is disclosed in the present instance as being of octagonal configuration. However, other configurations may be utilized. The frame member 160 is supported in a plane generally paralleling the desired predetermined tilted plane of rotation of the associated disc, and in overlying close proximity to the disc end plate 128 by means of a plurality of radiating support arms 162 having their outermost ends respectively secured to rod members 66b, 66c, 66d and 66e.

Each thrust bearing assembly 158 comprises a bearing block 164 of suitable material preferably of rectangular configuration, and has affixed to its outer surface a back-up block 166 which may be of metal or other appropriate material. The back-up block has an outer surface socket 168 midway between its ends with a rounded bottom and outwardly diverging side wall, this socket being adapted to receive the rounded end of a threaded adjusting bolt 170 having threaded engagement with a bracket 172 carried by the frame member 160. As thus arranged, the bolt 170 provides a single point support for the bearing block which permits it to floatingly and automatically adjust its surface contact with the disc end plate 128, and which may be adjusted through the bolt 170 together with the other thrust bearing assemblies to adjustably fine tune the angular position of the associated disc 32. The bearing block 164 is also retained within rather close limits of rotative movement about the axis of the bolt 170, due to the mounting position of the bearing block in closely paralleling relation to an adjacent octagonal side portion of the frame member 160. The bolt 170 may be locked in adjusted positions by a suitable lock nut 174. With the readily accessible bearing assemblies, the tuning adjustments of the bearings and replacement of parts in the field may be readily accomplished.

From the foregoing description and drawings, it will be clearly evident that the delineated objects and features of the invention will be accomplished.

Various modifications may suggest themselves to those skilled in the art without departing from the spirit of the herein disclosed invention and, hence, it is not wished to be restricted to the specific forms shown or uses mentioned, except to the extent indicated in the appended claims.

What is claimed is:

1. Fruit juice extraction apparatus, comprising:
   a frame structure;
   a pair of frusto-conical discs rotatably supported on said frame structure in generally confronting angular relation to provide a point of minimum peripheral spacing between the discs on one side, and a point of maximum peripheral spacing between the discs on a dimetral opposite side;
   stationary means positioned between the frusto-conical discs and cooperative therewith to form separate paths for the travel of the respective halves of cut fruit sections, each of said paths converging inwardly of the associated disc as well as circumferentially thereof in the direction of the disc rotation from a path inlet disposed adjacent said point of minimum spacing to a path outlet disposed adjacent said point of maximum spacing; and means for rotating said discs in unison.

2. Juice extraction apparatus according to claim 1, in which the frusto-conical discs have smooth surfaces in cooperative relation with said stationary means.

3. Juice extraction apparatus according to claim 1, which includes fruit cutting means disposed between the respective path inlets.

4. Juice extraction apparatus according to claim 3, in which the cutting means comprises a slicing knife for cutting fruit into half sections.

5. Juice extraction apparatus according to claim 4, in which a series of slitting knives are positioned on opposite sides of the slicing knife for slitting the exposed cut faces of the cut fruit sections.

6. Juice extraction apparatus according to claim 3, which includes means for feeding whole fruits into the space between the discs in advance of said point of minimum spacing, so that the discs will increasingly grip and hold the fruit as it is carried by the rotating discs to the fruit cutting means.

7. Juice extraction apparatus according to claim 6, in which the whole fruits are introduced substantially 30° in advance of said point of minimum spacing between the discs.

8. Juice extraction apparatus according to claim 6, in which a disc wiper is positioned in advance of the fruit feeding position for removing juice, pulp and seeds from the disc surfaces and to thereby reduce possible slippage between the disc surfaces and the gripped fruit.

9. Juice extraction apparatus according to claim 1, in which the fruit sections are moved through each of said paths by the associated rotating disc; the stationary means includes perforate wall means in each path for the flow of juice from the cut fruit sections which have their exposed cut surfaces engaged with the wall and which are forced thereagainst by a progressively applied pressure; and means at each path outlet for separating the pulp from the peel of said cut fruit sections.

10. Juice extraction apparatus according to claim 9, in which the pulp separating means comprises:
    grid bars extending along each of said paths in spaced relation transversely of the direction of travel of the cut fruit sections;
    a rotatably mounted roller extending across said bars having axially spaced circumferential projections adapted to extend into the spaces between the bars and engage the pulp of the fruit section therein; and
    knife means including a knife blade having a cutting edge extending transversely of said grid bars for separating the pulp from the peel of each cut fruit section.

11. Juice extraction apparatus according to claim 10, in which the rollers of the two paths are positioned substantially at the point of maximum spacing between the frusto-conical discs and have their axes of rotation in angular converging relation inwardly of the peripheries of the discs.

12. Juice extraction apparatus according to claim 11, in which said rollers are drivingly connected to independent power actuating means.

13. Juice extraction apparatus according to claim 1, which includes a main shaft rotatably supported on said frame structure; means connecting each of said discs to the shaft for rotation therewith, but enabling limited tilting movement thereon; and means for confining the rotation of the disc to predetermined planes of rotation disposed in angular relation.

14. Juice extraction apparatus according to claim 13, in which the connecting means for each disc comprises a ball and socket joint, the ball portion of which is slidably keyed to the shaft for axial adjusting movement to a desired operating position; in which the socket portion is removably mounted in a recess of the disc frame structure, and including means for retaining the ball portion in the adjusted operating position.

15. Juice extraction apparatus according to claim 14, in which the ball and socket portions have circumferentially extending surfaces of engagement of transverse concavo-convex configuration, and in which the concave surface is formed on the socket portion and has diametrically aligned opposed marginal edge cutout portions on one end of the socket portion to provide a partially cylindrical opening of a diametrical length and width to enable preassembly of the socket and ball portions by inserting the ball portion edgewise into a seated position within the socket portion and then by rotating 90° to bring the socket portion and ball portion into coaxial assembled relation.

16. Juice extraction apparatus according to claim 13, in which the connecting means for each disc to the shaft comprises a ball and socket joint, the ball portion of which is secured to the shaft for rotation therewith and the socket portion of which is fixedly secured to the disc; and a pin and slot connection between the ball portion and socket portion opposes relative rotation thereof, but enables relative tilting movements.

17. Juice extraction apparatus according to claim 16, wherein the slot is formed in the ball portion and the pin is mounted on the socket portion and has an end confined for movement along the slot.

18. Juice extraction apparatus according to claim 17, in which said pin end rotatably mounts a roller.

19. Fruit juice extraction apparatus, comprising:
a frame structure;
a main shaft rotatably supported on said frame structure;
a pair of frusto-conical discs mounted on said shaft in confronting spaced relation for unitary rotation with the shaft;
stationary means positioned between the frusto-conical discs and cooperative therewith to form separate pressure-applying juice extracting paths respectively for the travel of cut fruit havles;
means connecting each of said discs to said shaft including elements for adjustably varying the axial spacing of the discs on said shaft, and for independently varying the spacing of each of said discs in relation to said stationary means, said connecting means comprising key means connecting said discs for independent sliding axial movement on said shaft, adjustable variable length shaft sleeves positioned respectively between the discs and on an opposite side of one of the discs, and means for fixedly clampingly securing the discs and adjusted sleeves with respect to said shaft; and
means for rotating said shaft.

20. Juice extraction apparatus according to claim 13, in which the disc rotation confining means comprises for each disc a plurality of circumferentially spaced thrust bearing assemblies, each including a bearing member engaged with an outer surface of the disc.

21. Juice extraction apparatus according to claim 20, which includes means for adjusting the bearing assemblies for a predetermined tilt angle of the disc.

22. Juice extraction apparatus according to claim 20, in which the bearing member of each assembly is supported for adjusting movements towards and away from the associated disc.

23. Juice extraction apparatus according to claim 22, in which each of the bearing members mounts a back-up block having an outer surface formed with a recess; and a threaded axially adjustable member has an inner end seated in said recess to form a single point support for the bearing member.

24. Juice extraction apparatus according to claim 1, which includes means for adjusting the spacing between said discs.

25. Juice extraction apparatus according to claim 1, which includes means for independently adjusting the spacing between each of said discs and said stationary means.

26. Juice extraction apparatus according to claim 16, in which the ball portions of the ball and socket joints are positioned on a shaft end portion between an inner abutment shoulder and a threaded outer shaft end; means keying each of the ball portions to the shaft for axial movements thereon; spacing collars positioned respectively between the abutment shoulder and the ball portion of the innermost disc, between the ball portions of both discs and between the ball portion of the outermost disc and outer shaft end; and a retaining nut engaged with the threaded outer end coacting with said shoulder to clamp the collars and ball portions in assembled relation.

27. Juice extraction apparatus according to claim 26, in which the collar between the abutment shoulder and the innermost disc, and the collar between the discs are adjustable as to their length.

28. Juice extraction apparatus according to claim 27, in which the length adjustable collars each comprises threadedly engaged sections.

* * * * *